US012659435B2

(12) United States Patent
Tang et al.

(10) Patent No.: US 12,659,435 B2
(45) Date of Patent: Jun. 16, 2026

(54) PROJECTION APPARATUS AND METHOD FOR PROJECTION APPARATUS

(71) Applicant: HISENSE VISUAL TECHNOLOGY CO., LTD., Qingdao (CN)

(72) Inventors: Gaoming Tang, Qingdao (CN); Xianrong Liu, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 19/074,067

(22) Filed: Mar. 7, 2025

(65) Prior Publication Data

US 2025/0211717 A1 Jun. 26, 2025

Related U.S. Application Data

(63) Continuation of application No. PCT/CN2023/112977, filed on Aug. 14, 2023.

(30) Foreign Application Priority Data

Sep. 15, 2022 (CN) .......................... 202211122420.8

(51) Int. Cl.
*H04N 9/31* (2006.01)

(52) U.S. Cl.
CPC ......... *H04N 9/3182* (2013.01); *H04N 9/3194* (2013.01)

(58) Field of Classification Search
CPC ...... H04N 9/31; H04N 9/3155; H04N 9/3179; H04N 9/3182; H04N 9/3188; H04N 9/3194

(Continued)

(56) References Cited

U.S. PATENT DOCUMENTS

2008/0088807 A1 4/2008 Moon et al.
2022/0408066 A1* 12/2022 Chien ................. H04N 9/3194

FOREIGN PATENT DOCUMENTS

CN 101610420 A 12/2009
CN 103209311 A 7/2013
(Continued)

OTHER PUBLICATIONS

The World Intellectual Property Organization (WIPO) International Search Report for PCT/CN2023/112977 Nov. 27, 2023 5 Pages (including translation).

(Continued)

*Primary Examiner* — Sherrie Hsia
(74) *Attorney, Agent, or Firm* — Anova Law Group, PLLC

(57) ABSTRACT

A projection apparatus includes: a light emitting component, configured to project a projection content onto a projection surface; a camera, configured to photograph a sample image; at least one processor configured to execute instructions to cause the projection apparatus to: obtain a control command for image quality adjustment; in response to the control command, control the light emitting component to project a correction image onto the projection surface; obtain a sample image photographed by the camera for the correction image on the projection surface, and extract a background color parameter from the sample image; generate a color difference gain parameter according to the background color parameter and a standard color parameter; and adjust an image quality curve of the projection content according to the color difference gain parameter, and control the light emitting component to project the projection content onto the projection surface according to the image quality curve adjusted.

20 Claims, 9 Drawing Sheets

(58) Field of Classification Search
USPC .... 348/744–747, 655, 806, 807; 353/28, 30,
353/31, 69
See application file for complete search history.

(56) References Cited

FOREIGN PATENT DOCUMENTS

| | | | |
|---|---|---|---|
| CN | 106331665 | A | 1/2017 |
| CN | 106791737 | A | 5/2017 |
| CN | 114205570 | A | 3/2022 |
| CN | 115529445 | A | 12/2022 |
| JP | 2004080161 | A | 3/2004 |
| JP | 2018032923 | A | 3/2018 |
| WO | 2022036539 | A1 | 2/2022 |

OTHER PUBLICATIONS

China National Intellectual Property Administration (CNIPA) Office
Action 1 for Application No. 202211122420.8 Jan. 24, 2026 17
Pages (including translation).

* cited by examiner

Largest connected region

PROJECTION APPARATUS AND METHOD FOR PROJECTION APPARATUS

CROSS-REFERENCE TO RELATED APPLICATIONS

This application is a continuation application of International Application No. PCT/CN2023/112977, filed on Aug. 14, 2023, which claims priority to Chinese Patent Application No. 202211122420.8, filed on Sep. 15, 2022, and entitled "Projection Apparatus and Method for Projection Image Quality Adjustment", the content of all of which is incorporated by reference in their entirety.

TECHNICAL FIELD

The present disclosure relates to the field of electronic technology, and particularly to a projection apparatus and a method for projection image quality adjustment.

BACKGROUND

A projection apparatus is a display apparatus that can project an image or video onto a screen. In a process of projection, the projection apparatus needs to project a content of a projection image onto a curtain wall through a light emitting component. The curtain wall can be a screen used with the projection apparatus, such as a Fresnel hard screen. The curtain wall can also be a plane arranged in a projection direction of the light emitting component, such as a wall or a ceiling.

A presentation effect of the projection image can be affected by a color of the curtain wall. The color of the curtain wall may vary depending on user's usage scenarios. For example, when a wall is used as the curtain wall, a color of a surface of the wall is determined by a color of a wallpaper or wall paint. That is to say, in some application scenarios, the color of the curtain wall is not pure white, resulting in different effects of reflection on light of the projection image, so that the color viewed by a user is distorted and the user's experience is reduced.

SUMMARY

A projection apparatus according to embodiments of the present disclosure includes: a light emitting component, configured to project a projection content onto a projection surface; a camera, configured to photograph a sample image; at least one processor, in connection with the light emitting component and the camera, and configured to execute instructions to cause the projection apparatus to: obtain a control command for image quality adjustment; in response to the control command, control the light emitting component to project a correction image onto the projection surface; where the correction image includes a graphic card based on a standard color parameter; obtain a sample image photographed by the camera for the correction image on the projection surface, and extract a background color parameter from the sample image; generate a color difference gain parameter according to the background color parameter and the standard color parameter; and adjust an image quality curve of the projection content according to the color difference gain parameter, and control the light emitting component to project the projection content onto the projection surface according to the image quality curve adjusted.

A method for the projection apparatus according to embodiments of the present disclosure is disclosed, the projection apparatus includes a light emitting component, a camera and at least one processor, and the method includes: obtaining a control command for image quality adjustment; in response to the control command, controlling the light emitting component to project a correction image onto a projection surface; where the correction image includes a graphic card based on a standard color parameter; obtaining a sample image photographed by the camera for the correction image, and extracting a background color parameter from the sample image; generating a color difference gain parameter according to the background color parameter and the standard color parameter; and adjusting an image quality curve of a projection content according to the color difference gain parameter, and controlling the light emitting component to project the projection content onto the projection surface according to the image quality curve adjusted.

BRIEF DESCRIPTION OF FIGURES

FIG. 8 is a schematic diagram of a position point for extracting a background color value in a sample image according to embodiments of the present disclosure;

DETAILED DESCRIPTION

In order to make purposes and embodiments of the present disclosure clearer, embodiments of the present disclosure will be described clearly and completely below in combination with the accompanying drawings in embodiments of the present disclosure. Obviously, the described embodiments are some but not all embodiments of the present disclosure.

It should be noted that the brief description of the terms in the present disclosure is only for the convenience of understanding embodiments described hereafter, and is not intended to limit embodiments of the present disclosure. Unless otherwise specified, these terms should be understood according to the ordinary and plain meanings.

Embodiments of the present disclosure can be applied to various types of projection apparatuses. Hereinafter, a projector will be taken as an example to describe a projection apparatus and a method for projection image quality adjustment.

A projector is an apparatus that projects an image or video onto a screen. The projector can be connected with a computer, a radio and television network, the Internet, a Video Compact Disc (VCD), a Digital Video Disk (DVD), a game machine, a Digital Video Camera (DVD) and the like through different interfaces to play corresponding video signals. The projector is widely used in a home, an office, a school and an entertainment venue.

Figure 1:
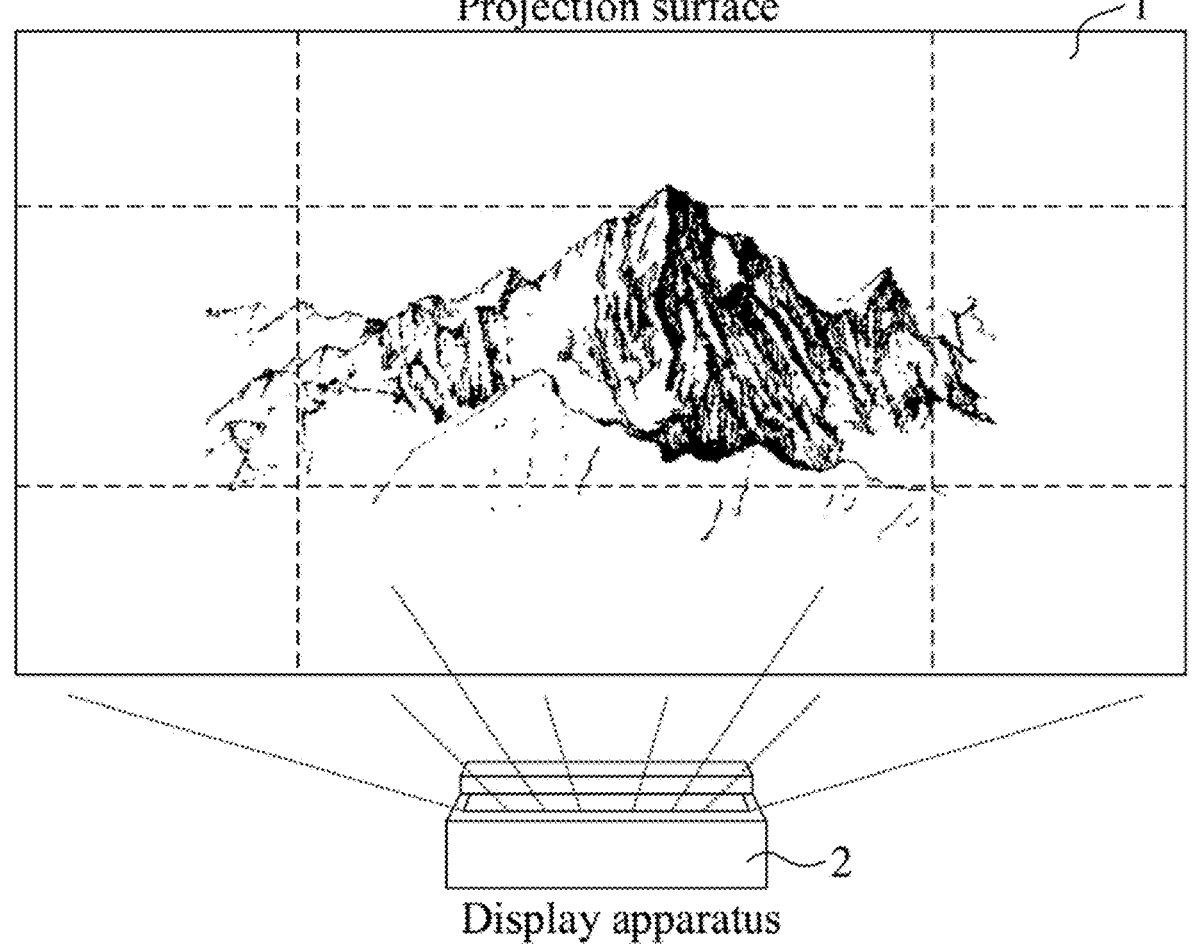
FIG. 1 is a schematic diagram of a projection state of a projection apparatus according to embodiments of the present disclosure.
Figure 2:
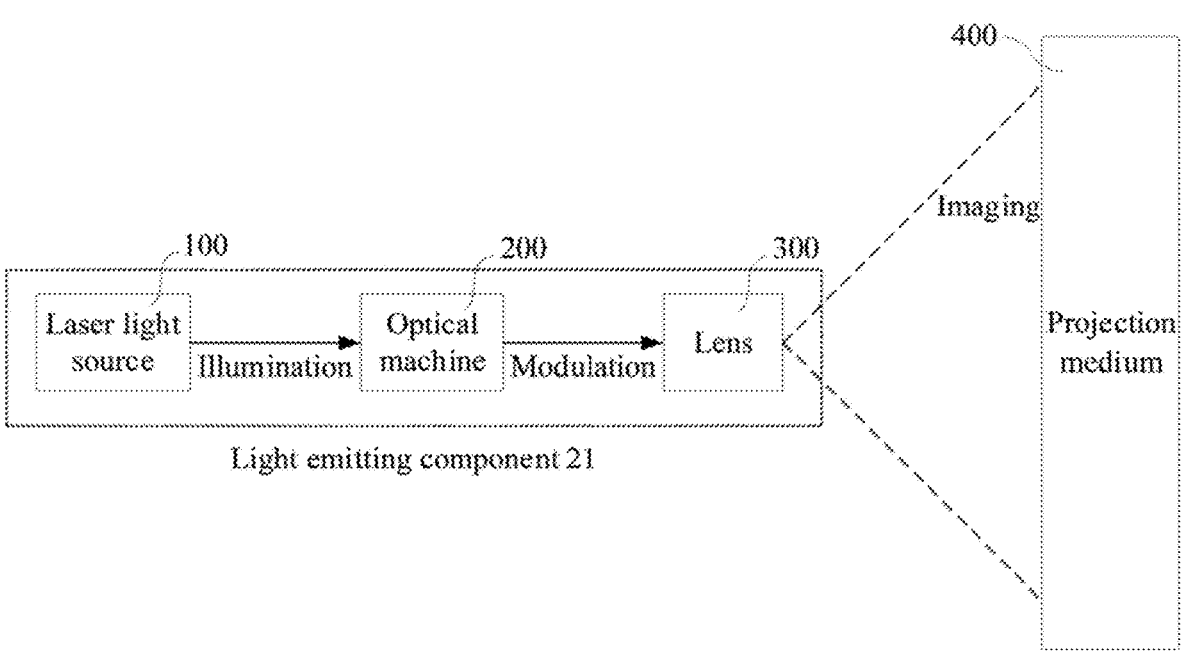
FIG. 2 is a schematic structural diagram of a projection apparatus according to embodiments of the present disclosure.

FIG. 1 is a schematic diagram of a projection state of a projection apparatus according to embodiments of the present disclosure. FIG. 2 is a schematic structural diagram of a projection apparatus according to embodiments of the present disclosure.

In some embodiments, referring to FIG. 1 and FIG. 2, a projection screen 1 is fixed at a first position, and a projection apparatus 2 is placed at a second position, so that an image projected from the projection apparatus 2 match the projection screen 1. The projection apparatus 2 includes a laser light source 100, an optical machine 200, and a lens 300. A projection image is projected onto a projection medium 400. The laser light source 100 provides illumination for the optical machine 200, and the optical machine 200 modulates a light beam of the light source and outputs the light beam to the lens 300 for imaging. An image from the lens 300 is projected onto the projection medium 400 to form a projection image. Because the laser light source 100, the optical machine 200 and the lens 300 are used together for emitting projection light to project a projection image, the laser light source 100, the optical machine 200 and the lens 300 are collectively referred to as a light emitting component 21.

In some embodiments, the laser light source 100 includes a laser component and an optical lens component. A light beam emitted by the laser component can pass through the optical lens component to provide illumination for the optical machine. The optical lens component requires a higher level of environmental cleanliness and airtight sealing. A chamber in which the laser component is mounted can use dustproof level sealing with a lower sealing level to reduce sealing costs.

In some embodiments, a light emitting component of the projector can also be implemented by an LED light source.

In some embodiments, the optical machine 200 can be implemented to include a blue optical machine, a green optical machine, a red optical machine, and can further include a heat dissipation system, a circuit control system, etc.

Figure 3:
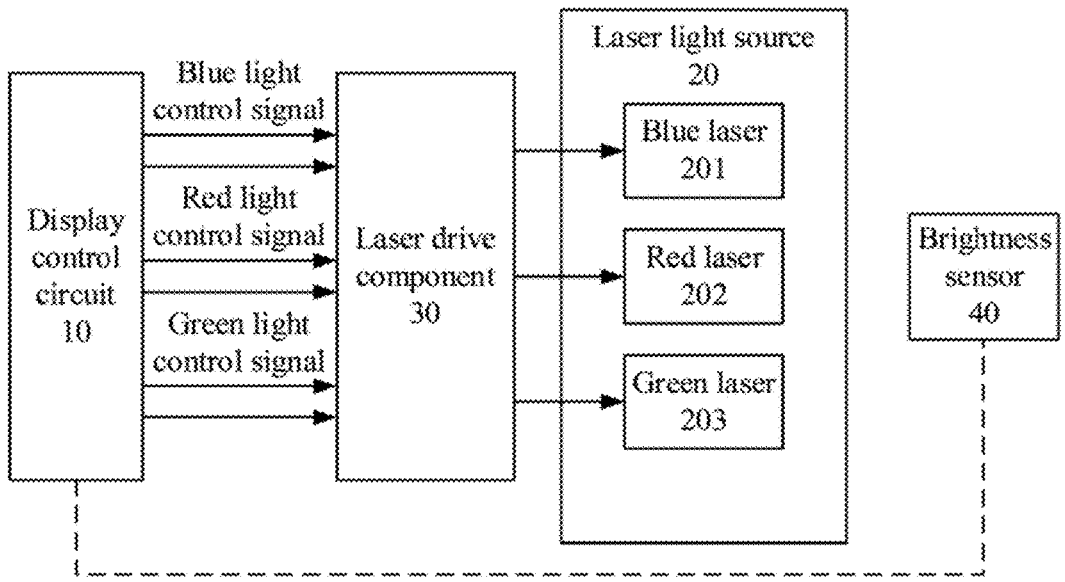
FIG. 3 is a schematic diagram of a circuit architecture of a projection apparatus according to embodiments of the present disclosure.

FIG. 3 is a schematic diagram of a circuit architecture of a projection apparatus according to embodiments of the present disclosure.

In some embodiments, referring to FIG. 3, the projection apparatus may include a display control circuit 10, a laser light source 20, at least one laser drive component 30, and at least one brightness sensor 40. The laser light source 20 can include at least one laser in one-to-one correspondence with the at least one laser drive component 30. At least one refers to one or more, and a plurality refers to two or more.

Based on the circuit architecture, the projection apparatus can realize self-adaptive adjustment. For example, by arranging the brightness sensor 40 in a light exit path of the laser light source 20, the brightness sensor 40 can detect a first brightness value of the laser light source 20 and send the first brightness value to the display control circuit 10.

The display control circuit 10 can obtain a second brightness value corresponding to a driving current of each laser, and determine that the laser has catastrophic optical damage (COD) failure when determining that a difference between the second brightness value of the laser and the first brightness value of the laser is greater than a difference threshold. The display control circuit 10 can adjust a current control signal of a laser drive component corresponding to the laser, until the difference is less than or equal to the difference threshold, to eliminate the COD failure of the laser. The projection apparatus can eliminate the COD failure of the laser in time, reduce a damage rate of the laser and improve an image display effect of the projection apparatus.

Figure 4:
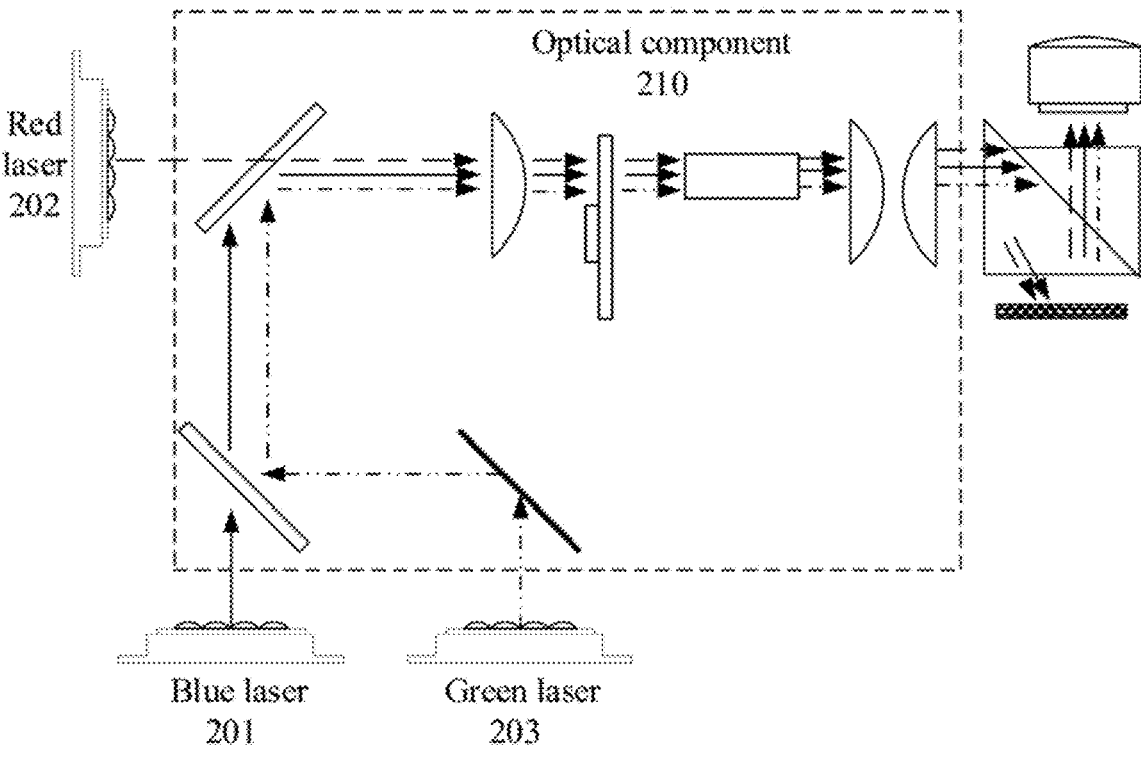
FIG. 4 is a schematic diagram of a light path of a projection apparatus according to embodiments of the present disclosure.

FIG. 4 is a schematic diagram of a light path of a projection apparatus according to embodiments of the present disclosure.

In some embodiments, referring to FIG. 3 and FIG. 4, the laser light source 20 can include a blue laser 201, a red laser 202, and a green laser 203 independently arranged. The projection apparatus can also be referred to as a three-color projection apparatus. The blue laser 201, the red laser 202, and the green laser 203 are small lasers (Multi_chip LD, abbreviated as MCL) with small volume, which is conducive to compact arrangement of optical paths.

In some embodiments, the laser light source further includes an optical component 210. The optical component 210 is configured to combine laser beams emitted by the blue laser 201, the red laser 202 and the green laser 203, perform shaping and homogenizing, and finally emit a light beam which meets an incident requirement to the optical machine.

In some embodiments, the projection apparatus can be configured with at least one processor, or the projection apparatus can be connected with at least one processor. The at least one processor includes at least one of a Central Processing Unit (CPU), a video processor, an audio processor, a Graphics Processing Unit (GPU), a Random Access Memory (RAM), a Read-Only Memory (ROM), a first interface to an nth interface for input/output, or a Bus, etc.

In some embodiments, the projection apparatus can be configured with a camera, or the projection apparatus can be connected with a camera, to cooperate with the projection apparatus to realize adjustment and control of the projection process. The camera can be implemented as a 3D camera, or a binocular camera. When the camera is implemented as a binocular camera, the binocular camera includes a left camera and a right camera. The binocular camera can obtain a projection screen corresponding to the projection apparatus, i.e., an image and a playing content presented by a projection surface. The image or playing content is projected by an optical machine built in the projection apparatus.

When the projection apparatus moves, a projection angle of the projection apparatus and a distance of the projection apparatus to a projection plane may change, resulting in deformation of the projection image. The projection image can be displayed as a trapezoidal image, or other misshapen image. The at least one processor can, based on an image photographed by the camera, realize automatic trapezoidal correction through coupling of an included angle between the optical machine and the projection plane and correct display of the projection image.

Figure 5:
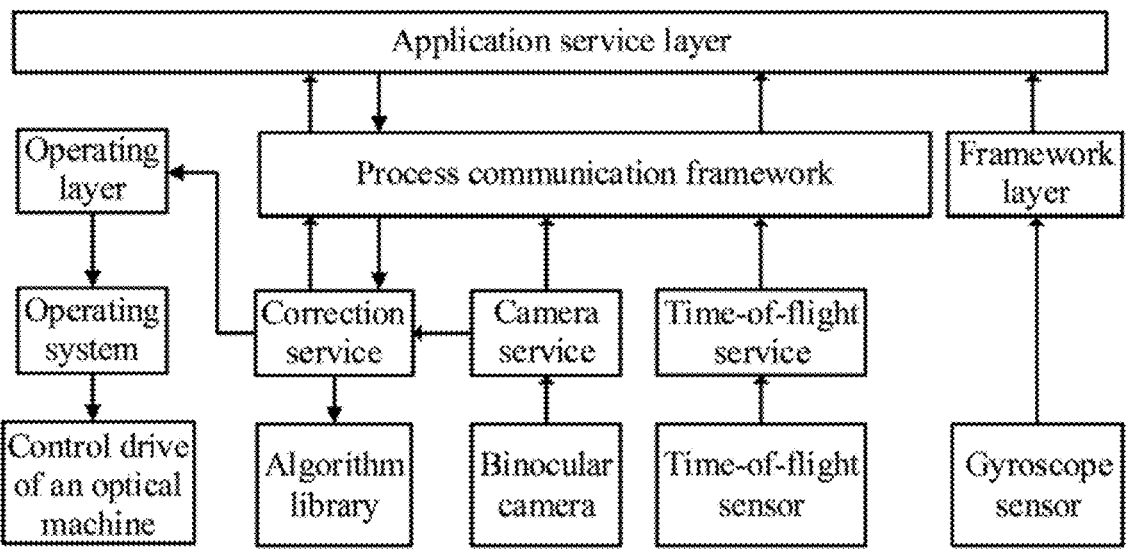
FIG. 5 is a schematic diagram of a system framework of a projection apparatus according to embodiments of the present disclosure.

FIG. 5 is a schematic diagram of a system framework of a projection apparatus according to embodiments of the present disclosure.

In some embodiments, referring to FIG. 5, the projection apparatus has characteristics of telephoto and micro projection. The at least one processor of the projection apparatus can control display of the projection image through a preset algorithm, to realize functions of automatic trapezoidal correction, automatic screen entry, automatic obstacle avoidance, automatic focusing, and preventing eyes from being projected for a display image.

In some embodiments, the projection apparatus is configured with a gyroscope sensor. During movement of the projection apparatus, the gyroscope sensor can sense position movement and actively collect movement data, and then send collected data to an application service layer through a system framework layer, to support application data required in a process of user interface interaction and application interaction. The collected data can also be used for data call of the at least one processor in an algorithm service implementation.

In some embodiments, the projection apparatus is provided with a time-of-flight sensor. After the time-of-flight sensor collects corresponding data, collected data is sent to a time-of-flight service corresponding to a service layer. After the time-of-flight service obtains the data, the collected data is sent to an application service layer through a process communication framework. The data will be used for interactive use of data call, user interface, program application and the like of the at least one processor.

In some embodiments, the projection apparatus is configured with a camera for capturing images. The camera can be a binocular camera, a depth camera, a 3D camera, etc. Data collected by the camera is sent to a camera service, and then the camera service sends collected image data to a process communication framework and/or a projection apparatus correction service. The projection apparatus correction service can receive camera collected data sent from the camera service. The at least one processor can call a corresponding control algorithm in an algorithm library for different functions to be realized.

In some embodiments, data is interacted with an application service through a process communication framework, and then a calculation result is returned to a correction service through the process communication framework. The correction service sends the obtained calculation result to a projection apparatus operating system to generate a control signaling, and the control signaling is sent to a control drive of the optical machine to control a working condition of the optical machine and realize automatic correction of the display image.

In some embodiments, a user may use the projection apparatus in a variety of different scenarios. Different projection planes can be used as the projection medium 400 in different use scenarios. For example, some users need to project onto a Fresnel hard screen, that is, the projection medium 400 is a Fresnel hard screen; some users need to project onto a white wall, that is, the projection medium 400 is a white wall; some users need to project to a ceiling, that is, the projection medium 400 is the ceiling. For convenience of description, in embodiment of the present disclosure, the projection medium 400, the projection surface, the background wall, and the like all refer to a medium for presenting a projection image, and unless otherwise specified, the projection medium 400, the projection surface, and the background wall have the same meaning and function.

The projection apparatus may present different projection effects on different projection medium 400. Because the color of the projection medium 400 itself will have different reflection effects on different colors in the projection image, color distortion for a projection medium 400 that is not purely white can occur. That is, when the background wall used in the projection process is a pure color background, such as pure color latex paint, putty wall, pure color curtain, etc., the projection image can be presented towards an effect of a background color, for example, the projection image presented by a pure gray background tends to be gray; the projection image presented by a pure yellow background tends to be yellow.

Moreover, in addition to the color influence of the projection medium 400 itself, using a lighting color in a scenario will also affect a presentation effect of the projection image. For example, lighting devices such as incandescent lamp, warm light, yellow light, pink light, etc., used in the scenario can also cause the projection medium 400 to lean towards one color. As a result, the color of the projection image presented by the projection medium 400 is also distorted, and a quality of the projection image is reduced.

Figure 6:
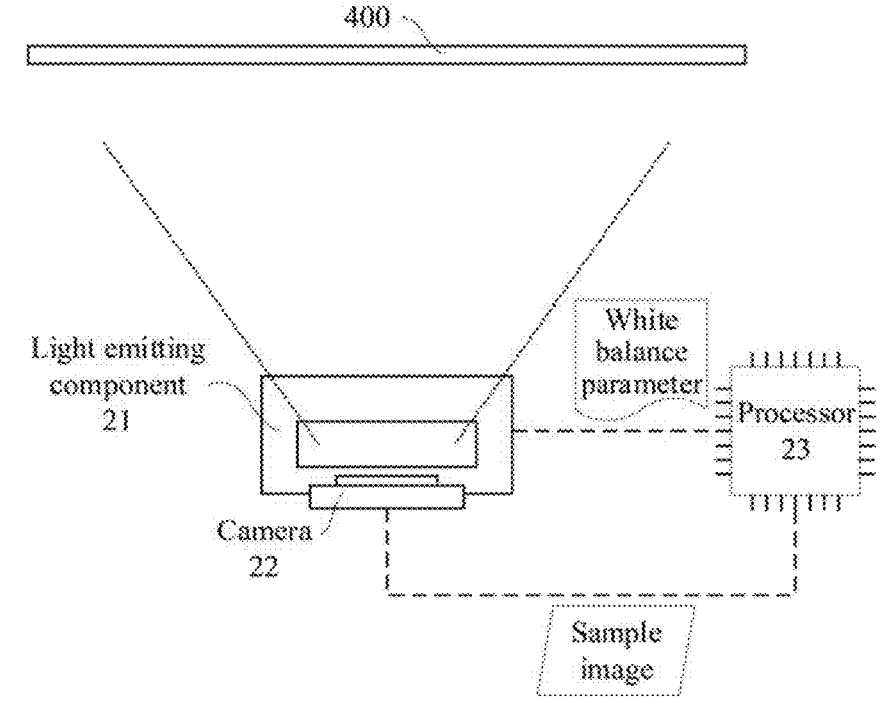
FIG. 6 is a schematic diagram of a projection apparatus with a camera according to embodiments of the present disclosure.

In order to improve the quality of the projection image, embodiments of the present disclosure provide a method for projection image quality adjustment. The method can be applied to the projection apparatus described above. As shown in FIG. 6, in order for the projection apparatus to implement the method for projection image quality adjustment described above, the projection apparatus at least includes a light emitting component 21, a camera 22 and at least one processor 23.

The light emitting component 21 is configured to project a projection content onto a projection surface (projection medium 400). The projection content includes a user interface and a media resource image to be played. For example, when a user uses a remote control matched with the projection apparatus to set the projection apparatus, the light emitting component 21 can project a setting interface onto the projection surface. When a user uses the projection apparatus to watch multimedia resources such as movies and TV series, the light emitting component 21 can project a media resource image onto the projection plane.

The camera 22 is configured to photograph a sample image. The camera 22 can photograph an image of an environment in which the projection apparatus is located to obtain a scenario image. The camera 22 can photograph images of different objects according to different capturing purposes. For example, when the projection apparatus adjusts a projection image quality, the camera 22 can photograph a projection surface, to obtain a sample image including a content of a projection image. When the projection apparatus automatically avoids an obstacle, the camera 22 can photograph a target in front of projection of the light emitting component, to obtain a sample image including a target of the obstacle.

Figure 7:
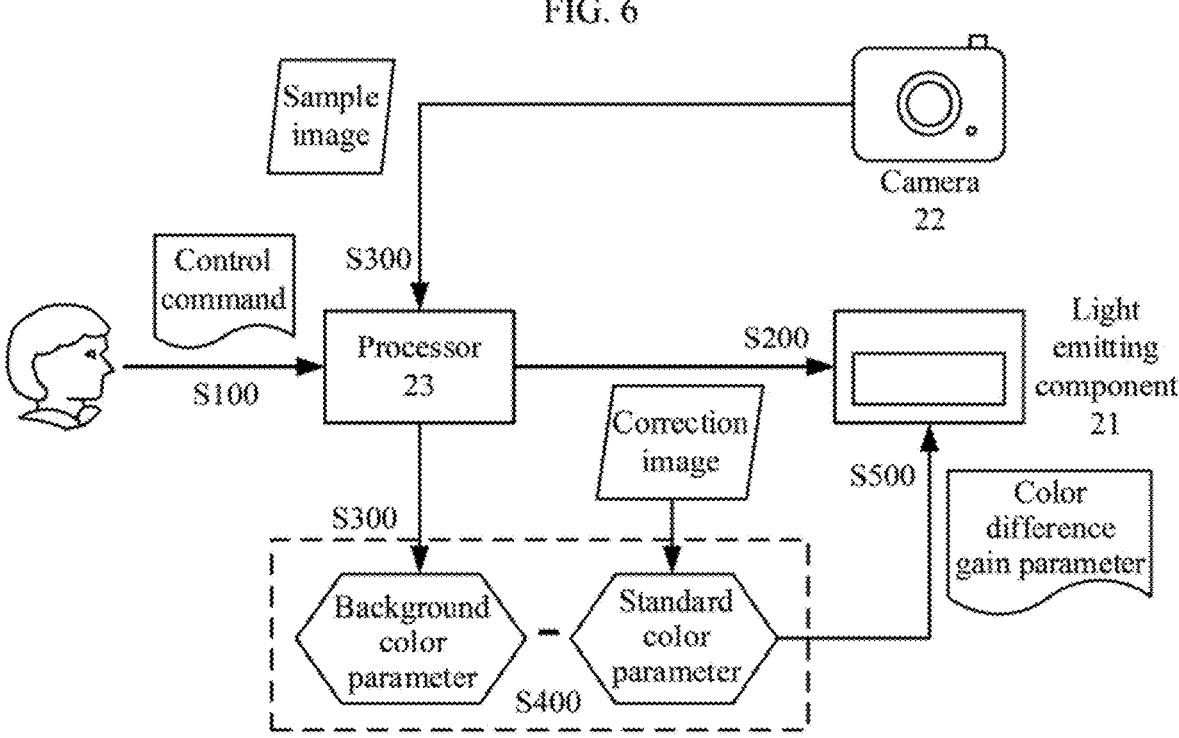
FIG. 7 is a schematic flowchart of adjusting an image quality according to embodiments of the present disclosure.

The at least one processor 23 is then configured to execute program steps corresponding to the method for projection image quality adjustment. As shown in FIG. 7, the method for projection image quality adjustment includes following contents.

S100: A control command for image quality adjustment is obtained.

In order to trigger and control the projection apparatus to perform the image quality adjustment, the at least one processor 23 may obtain a control command for the image quality adjustment.

In some embodiments, the control command for image quality adjustment can be actively input from a user. For example, when the user notices that the color of the projection image is distorted, a control command for image quality adjustment is input by pressing an "Auto White Balance" key on a remote control (or on the projection apparatus).

In some embodiments, the control command for image quality adjustment may also be input when the user performs other related specific operations. For example, when the projection apparatus detects that the user starts up for the first time (or the user starts up for the first time after the factory setting is restored), the image quality adjustment can be automatically triggered according to an initialization program of the projection apparatus. When the user controls the projection apparatus to start up for the first time, the control command for image quality adjustment is automatically input from the initialization program.

In some embodiments, the control command for image quality adjustment can also be automatically input when the projection apparatus detects change of the use scenario. For example, a photosensitive sensor can be built into the projection apparatus. When detecting that brightness variation in the environment exceeds a preset projection brightness range, it is determined that the use scenario of the projection apparatus is changed. In this case, a control command for image quality adjustment can be automatically input. For another example, components such as a gyroscope, a gravity acceleration sensor, a vibration sensor, and the like can also be arranged in the projection apparatus, for detecting whether the projection apparatus moves or not. When detecting that the projection apparatus moves, the image quality adjustment can be automatically triggered to adapt to a new use environment, that is, to a control command for image quality adjustment is input.

It should be noted that the above embodiments briefly describe the input method of the control command for image quality adjustment. Obviously, in practical applications, the projection apparatus can input the control command for image quality adjustment through a method other than the input method of the above examples. For example, the projection apparatus is controlled to adjust the image quality by voice. When the projection apparatus projects different types of media resource images, the image quality adjustment can be automatically triggered when the media resource images are switched. Other associated input methods based on the above input method for the control command all belong to the protection scope of the present disclosure.

S200: In response to the control command, the light emitting component is controlled to project a correction image onto the projection surface.

After obtaining the control command for image quality adjustment, the at least one processor 23 can control the light emitting component 21 to project the correction image. The correction image includes a graphic card based on a standard color parameter. The correction image can be an image that facilitates color correction, for example, a pure color image based on standard red, standard green, standard blue, standard white, and standard black.

For the correction image, the standard color parameter can be represented by standard color values, that is, colors with standard RGB chromaticity values. For example, the RGB chromaticity value of standard red is (255,0,0), the RGB chromaticity value of standard green is (0,255,0), the RGB chromaticity value of standard blue is (0,0,255), the RGB chromaticity value of standard white is (255,255,255), and the RGB chromaticity value of standard black is (0,0,0).

In an actual image quality adjustment process, the light emitting component 21 can project the correction image based on any one of the standard colors onto the projection surface. For example, a pure white correction image is projected to the projection surface. It is also possible to sequentially project correction images based on a plurality of standard colors to the projection surface. For example, pure red, green, blue, white, and black correction images are sequentially projected onto the projection surface.

When the at least one processor 23 executes the process of controlling the light emitting component 21 to project the correction image onto the projection surface, the at least one processor can also be configured to obtain a plurality of correction images, and then control the light emitting component 21 to sequentially project the plurality of correction images onto the projection surface. The plurality of correction images are respectively based on different standard color values. In the process of projecting the correction images, the light emitting component 21 can preset a projection time for the correction image of each color. The projection time should be set so that the camera 22 can complete the photographing process. For example, when the preset projection time is 5 seconds, the light emitting component 21 can first project a pure red correction image, when the projection time reaches 5 seconds, a pure green correction image is projected instead, when the projection time of the green correction image reaches 5 seconds, a pure blue correction image is projected instead, and so on, until the projection of the correction images of all five colors is completed.

In some embodiments, the correction image can include a graphic card of a specific shape pattern in addition to having a pure color background. The graphic card can be composed of a plurality of patterns based on different standard shapes, sizes and positions. The at least one processor 23 can determine whether the projection image is deformed according to the shape, size and position of the graphic card in the projection image, to determine projection parameters according to a deformation condition of the shape in the graphic card and alleviate the influence of distortion and perspective effect on the projection image.

S300: A sample image photographed by the camera for the correction image on the projection surface is obtained, and a background color parameter is extracted from the sample image.

After controlling the light emitting component 21 to project the correction image, the at least one processor 23 can control the camera 22 to photograph the projected correction image, to obtain a sample image. To obtain the sample image, the at least one processor 23 can receive an acknowledgement signal from the light emitting component 21, after controlling the light emitting component 21 to project the correction image. Upon receipt of the acknowledgement signal, a photographing instruction is sent to the camera 22 to cause the camera 22 to photograph the correction image to obtain the sample image in response to the photographing instruction.

When the light emitting component 21 sequentially projects a plurality of correction images, the at least one processor 23 can also control the camera 22 to photograph each of the correction images separately to obtain a plurality of sample images. That is, in some embodiments, in the step of obtaining the sample image photographed by the camera for the correction image, the at least one processor 23 is further configured to: obtain a projection content switching signal from the light emitting component. The projection content switching signal is generated when the light emitting component projects different correction images. In response to the projection content switching signal, a photographing instruction is sent to the camera 22, for the camera 22 to photograph a plurality of sample images for a plurality of correction images.

For example, after the at least one processor 23 controls the light emitting component 21 to project a first pure red correction image, since the light emitting component 21 needs to switch from projecting other content to projecting the pure red correction image, a projection content switching signal is generated and sent to the at least one processor 23. The at least one processor 23 sends a photographing instruction to the camera 22 in response to the projection content switching signal, so that the camera 22 can photograph a sample image corresponding to the pure red correction image. After the light emitting component 21 projects the pure red correction image for 5 seconds, the light emitting component 21 can automatically switches to project a pure green correction image. Similarly, a projection content switch signal is generated, in response to the projection content switching signal, the at least one processor 23 sends a photographing instruction to the camera 22 so that the camera 22 photographs to obtain a pure green correction image. Similarly, when the light emitting component 21 switches the projected correction image each time, the at least one processor 23 correspondingly sends a photographing instruction to the camera 22, until all of the correction images are projected, so that the same number of sample images are obtained. That is, the camera 22 can perform five times of photographing corresponding to pure red, green, blue, white, and black correction images sequentially projected by the light emitting component 21, to obtain sample images including contents of pure red, green, blue, white and black correction images.

In order to obtain a better photographic effect, in some embodiments, when the at least one processor 23 sends a photographing instruction to the camera 22 for the first time within a detection period, the camera can be triggered to automatically adjust photographing parameters, such as focal length, aperture, brightness, etc., to obtain a clear sample image. In addition, after the photographing parameters are adjusted automatically, the photographing parameters of the camera 22 can be controlled to remain stable, so that parameters of subsequent sample images photographed by the camera 22 are consistent with parameters of the first sample image, to avoid influence of the photographing parameters on colors of the sample images. That is, a mode of the camera 22 is fixed, so that sample images captured by the camera 22 have high consistency.

After the sample image is obtained, the at least one processor 23 can further perform feature extraction on the sample image. That is, a background color parameter is extracted from the sample image. Similar to the standard color parameter, the background color parameter can also be represented by a background color value. For a sample image with pure color content, the at least one processor can extract a color value directly from a pure color region of the sample image. Since the sample image is an image captured by the camera 22 directly for a final display effect of the projection image, a difference between the color value and an original standard color of the correction image can be used to determine a projection color difference, i.e., a degree of color distortion.

Obviously, in order to facilitate extraction of the background color value in the sample image, a proportion of a region occupied by the projection image in the image photographed by the camera 22 shall be large enough. For example, a photographing range of the camera 22 is smaller than a range of the projection surface, that is, the image in the entire sample image is the projection image. To achieve this effect, the projection apparatus can automatically adjust a focal length of the camera 22 the first time the camera 22 photographs, so that the photographing range of the camera 22 is smaller than or equal to the range of the projection image.

In some embodiments, after obtaining the sample image, the at least one processor 23 can also perform an image recognition algorithm on the sample image, to identify a region of the projection image in the sample image. Generally, due to the influence of the light emitted by the light emitting component, the projection image is generally a connected region with high brightness and regular shape. In the sample image photographed, the connected region corresponding to the projection image generally occupies a larger area. That is, the largest connected region is most likely to be the region of the projection image. To this end, in the step of extracting the background color value from the sample image, the at least one processor 23 is further configured to: identify a largest connected region from the sample image. The largest connected region is a region in which color differences of pixels in the sample image are less than a color difference threshold and an area occupied by the pixels is the largest.

Figure 8:
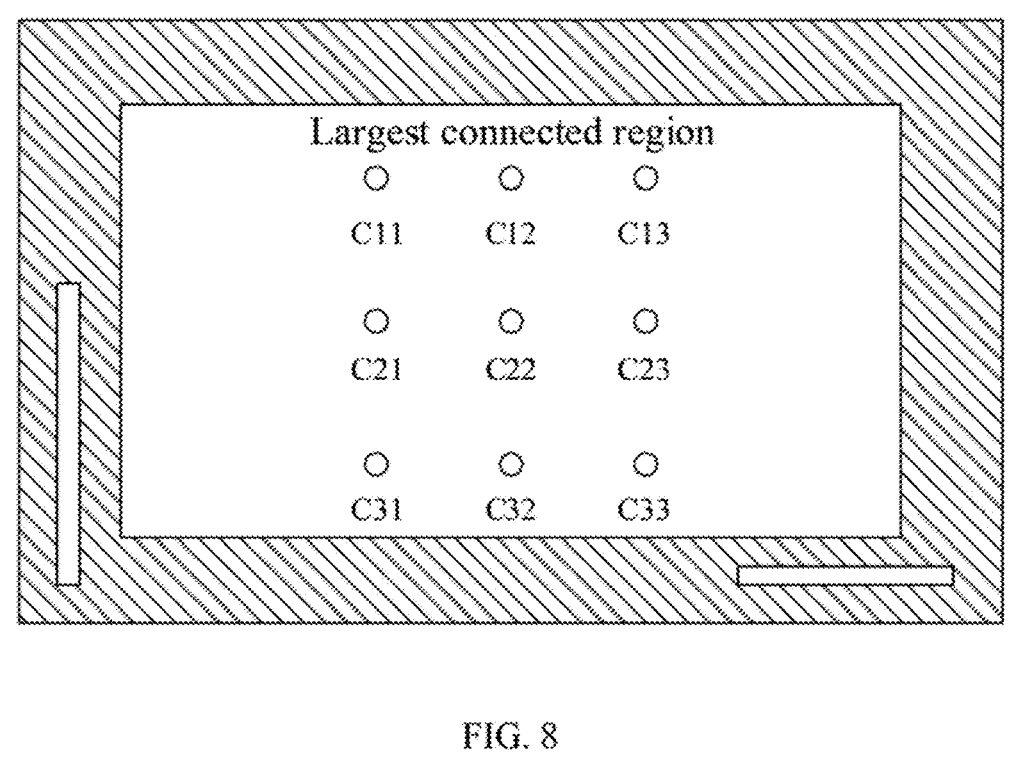

After the largest connected region is identified, the at least one processor 23 also needs to extract color values of a plurality of position points in the largest connected region. For example, as shown in FIG. 8, according to a shape of the identified largest connected region, nine sampling points in the largest connected region are uniformly extracted. The nine sampling points are arranged in a rectangular array in the form of 3×3 in the largest connected region, so that each sampling point corresponds to a different position in the largest connected region.

A background color value is calculated according to the color values of the plurality of position points. The background color value is an average value of the color values of the plurality of position points. For example, the color values respectively extracted at the nine sampling points are C11, C12, C13, C21, C22, C23, C31, C32, and C33. The calculated background color value is: $B1=(C11+C12+C13+C21+C22+C23+C31+C32+C33)/9$.

It should be noted that in order to facilitate the extraction of the background color value, after the camera 22 obtains the sample image, the at least one processor 23 can also cut the sample image according to a content recognition result in the sample image. For example, when the largest connected region is identified, the sample image is cut according to a boundary position of the largest connected region. Obviously, since the photographing parameters of the camera 22 are consistent when photographing the plurality of correction images, for the sample images corresponding to the plurality of correction images, positions and ranges of the projection regions are also consistent. Therefore, after the sample image corresponding to the first correction image is cut, other subsequent images can also be cut in turn according to the cutting method for the first correction image, and it is not necessary to repeat identification of the largest connected region.

S400: a color difference gain parameter is generated according to the background color parameter and the standard color parameter.

After extracting the background color parameter, the at least one processor 23 can perform a correction of the color distortion problem, that is, the color difference gain parameter of the background color parameter relative to the standard color parameter is calculated. The color difference gain parameter is a benefit parameter calculated by a compensation algorithm after comparing the difference between the background color value and the standard color value. The image quality can be compensated through the color difference gain parameter, to alleviate the color distortion problem. The benefit parameter can be calculated through a built-in gain function (gains) of the system.

For example, after identifying the largest connected region from the sample image, a gain gain1 of the background color value B1 relative to the standard color value B0 is calculated according to the background color value B1 in the sample image and the standard color value B0 corresponding to the correction image and set to white balance for subsequent image quality adjustment.

Similarly, when the light emitting component 21 projects a plurality of correction images in sequence, the at least one processor 23 can also perform calculation of color difference gain parameters respectively for a plurality of sample images. For example, after the at least one processor 23 analyzes five sample images photographed by the camera 22, RGB calculation is performed based on color values of pixels in the sample images. Gains calculation is performed with RGB three colors of standard red, green, blue, white and black to obtain the color difference gain parameter for the standard color value.

S500: An image quality curve of the projection content is adjusted according to the color difference gain parameter, and the light emitting component is controlled to project the projection content onto the projection surface according to the adjusted image quality curve.

After the color difference gain parameter is calculated, the projection process can be adjusted according to the color difference gain parameter. When the projection apparatus sets an image parameter, the image quality curve of the projection content is adjusted according to the color difference gain parameter. That is, a gains parameter is compensated to an image quality parameter in accordance with a debugged curve according to the debugged curve, to realize reverse curve superposition on the RGB color value of the background wall. Then the light emitting component 21 is controlled to project the projection content according to the adjusted image quality curve, so that the final effect seen by the user is the effect of restoring to the original color, and the projection image quality is improved.

As can be seen from the above embodiments, the method for projection image quality adjustment can sample and photograph a projection image of a correction image based on a standard color value through a camera 22, to obtain a background color value in a sample image, and then compare the background color value with the standard color value to determine a color distortion condition of the projection image, so that the projection process is adjusted according to the color distortion condition, and the projection image quality is improved.

In addition, in the embodiments described above, the camera 22 can be a built-in component of the projection apparatus. By presetting a photographing position and photographing parameter of the camera 22, the camera 22 can photograph a whole light emitting region. In addition, for the problem that different settings of exposure time and the like for the camera 22 to photograph lead to inconsistent effects of captured images, the projection apparatus used in the above embodiments can also fix the photographing mode when triggering color recognition of the projection wall and the projection curtain, so that the captured sample images have high consistency. In addition, since the projection apparatus uses the camera 22 to directly photograph the projection image, illumination around the projection apparatus can be superimposed on the color of the background wall, that is, the image quality can be adjusted based on the final projection effect, so that it is easier to adjust the final effect to restore the original color effect after adjustment.

When the difference between the background color value and the standard color value is small, the current color distortion has little influence on the viewing experience of the user. Therefore, in order to enable the light emitting component to project the user interface or the media resource image onto the projection surface as soon as possible, in some embodiments, it is also possible to control whether to perform image quality adjustment according to the difference between the background color value and the standard color value. That is, in the step of generating the color difference gain parameter according to the background color parameter and the standard color parameter, the at least one processor 23 is further configured to: obtain a standard color value corresponding to the correction image and a background color value corresponding to the sample image. Since the correction image includes a graphic card based on a standard color value, that is, there is a mapping relationship between a correction image and a standard color value, when the at least one processor 23 controls the light emitting component 21 to project a correction image onto the projection surface, the at least one processor 23 can read description information of a file corresponding to the correction image, to obtain a standard color value which has a mapping relationship with the current correction image.

In some embodiments, the at least one processor 23 can also perform color recognition on the correction image before controlling the light emitting component 21 to project the correction image, that is, color values of pixels in the correction image are traversed to determine a color value corresponding to pixels with the most same colors as a standard color value.

After the standard color value is obtained, the difference between the standard color value and the background color value can be calculated. For convenience of description, the difference between the standard color value and the background color value can be simply called the color difference. For example, the standard color value read from the correction image is B0, and the background color value extracted from the sample image is B1. Then the difference between the standard color value and the background color value can be calculated, that is, the color difference is $\Delta B = B1 - B0$.

Figure 9:
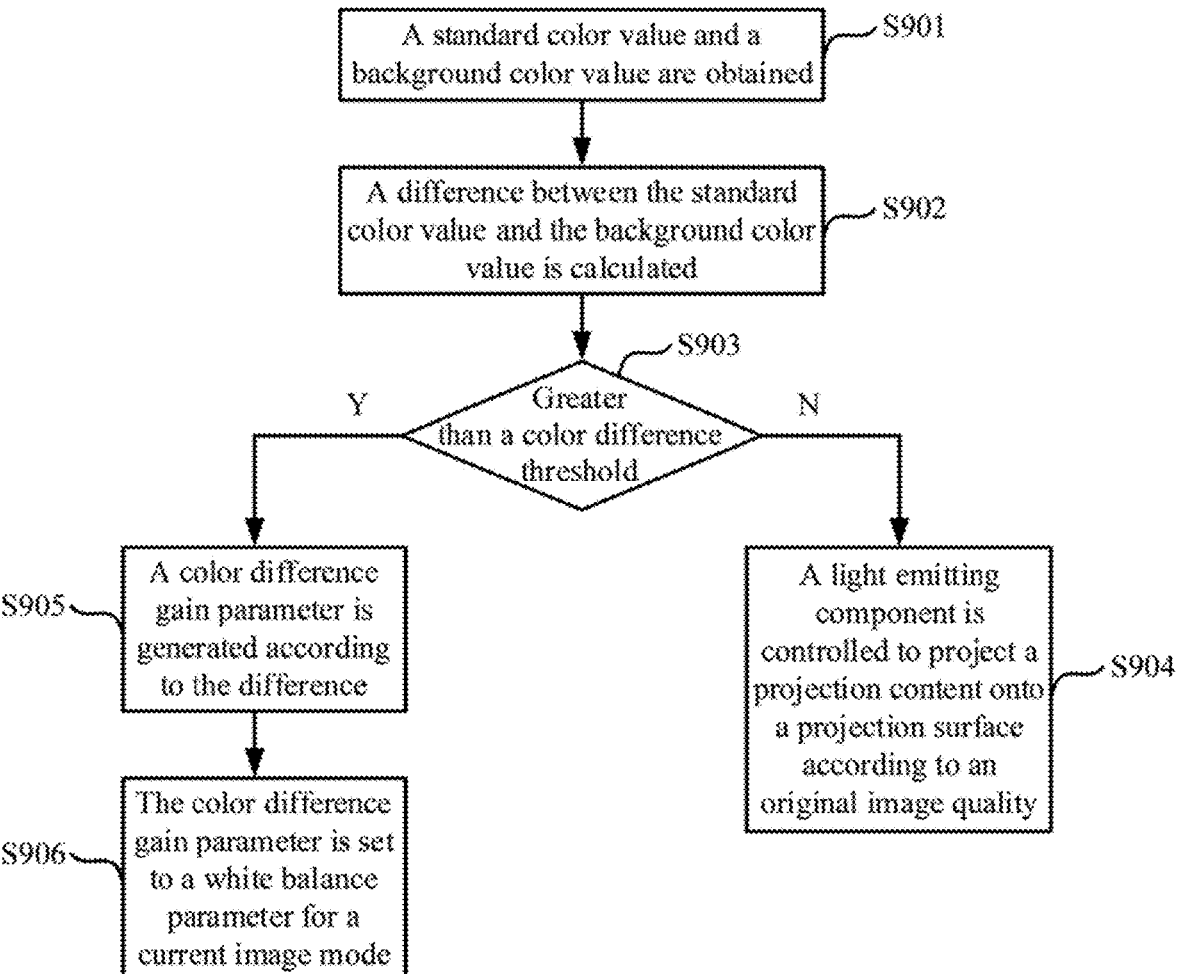
FIG. 9 is a schematic flowchart of controlling projection of a light emitting component according to embodiments of the present disclosure.

After the difference AB between the standard color value and the background color value is calculated based on the above formula, the color difference AB can be compared with a preset color difference threshold B. As shown in FIG. 9, following steps are included.

S901: A standard color value and a background color value are obtained.

S902: A difference between the standard color value and the background color value is calculated.

S903: Whether the color difference is greater than a color difference threshold is determined. When the color difference is less than or equal to the color difference threshold, S904 is performed. When the color differ-ence is greater than the color difference threshold, S905 is performed.

S904: A light emitting component is controlled to project a projection content onto a projection surface according to an original image quality.

S905: A color difference gain parameter is generated according to the color difference.

S906: The color difference gain parameter is set to a white balance parameter for a current image mode.

When the color difference AB is smaller than or equal to the preset color difference threshold B, it indicates that the current color distortion has little influence on the user's viewing experience. Therefore, the projection can be directly performed according to the original image quality without adjusting the image quality. That is, the at least one processor controls the light emitting component to project the projection content onto the projection surface according to the original image quality.

When the color difference AB is greater than preset color difference threshold B, it indicates that the current color distortion has a greater impact on the user's viewing experience, and image quality adjustment is required. A color difference gain parameter can thus be generated according to the color difference AB, and the color difference gain parameter is set to the white balance parameter for the current image mode.

In some embodiments, each time the color difference gain parameter is set to the white balance parameter for the current image mode, the image quality adjustment effect can also be verified by obtaining the sample image again and making a secondary determination. That is, after setting the color difference gain parameter to the white balance param-eter for the current image mode, the at least one processor 23 is further configured to: control the light emitting com-ponent to project the correction image according to an image mode in which the white balance parameter is set. For example, after the color difference gain parameter is set to the white balance parameter for the current image mode, the light emitting component 21 projects the projection content by reducing a chromaticity value of a red color channel by 20 points. Then, the correction image is projected again according to the white balance parameter. Theoretically, the chromaticity value of the red channel will be reduced by 20 points to cope with the color distortion problem of the image being presented towards red.

For the correction image projected by the light emitting component 21 after the white balance parameter is set, the camera 22 can perform photographing again, to obtain a resample image and perform determination and image qual-ity adjustment again according to the resample image. In some embodiments, due to the influence of the scenario, the effect of automatic image quality adjustment cannot meet the user's requirements. Therefore, the projection apparatus cannot resample countless times. For this purpose, the number of resampling times can be set in advance, that is, a threshold for a number of photographing times can be set.

Figure 10:
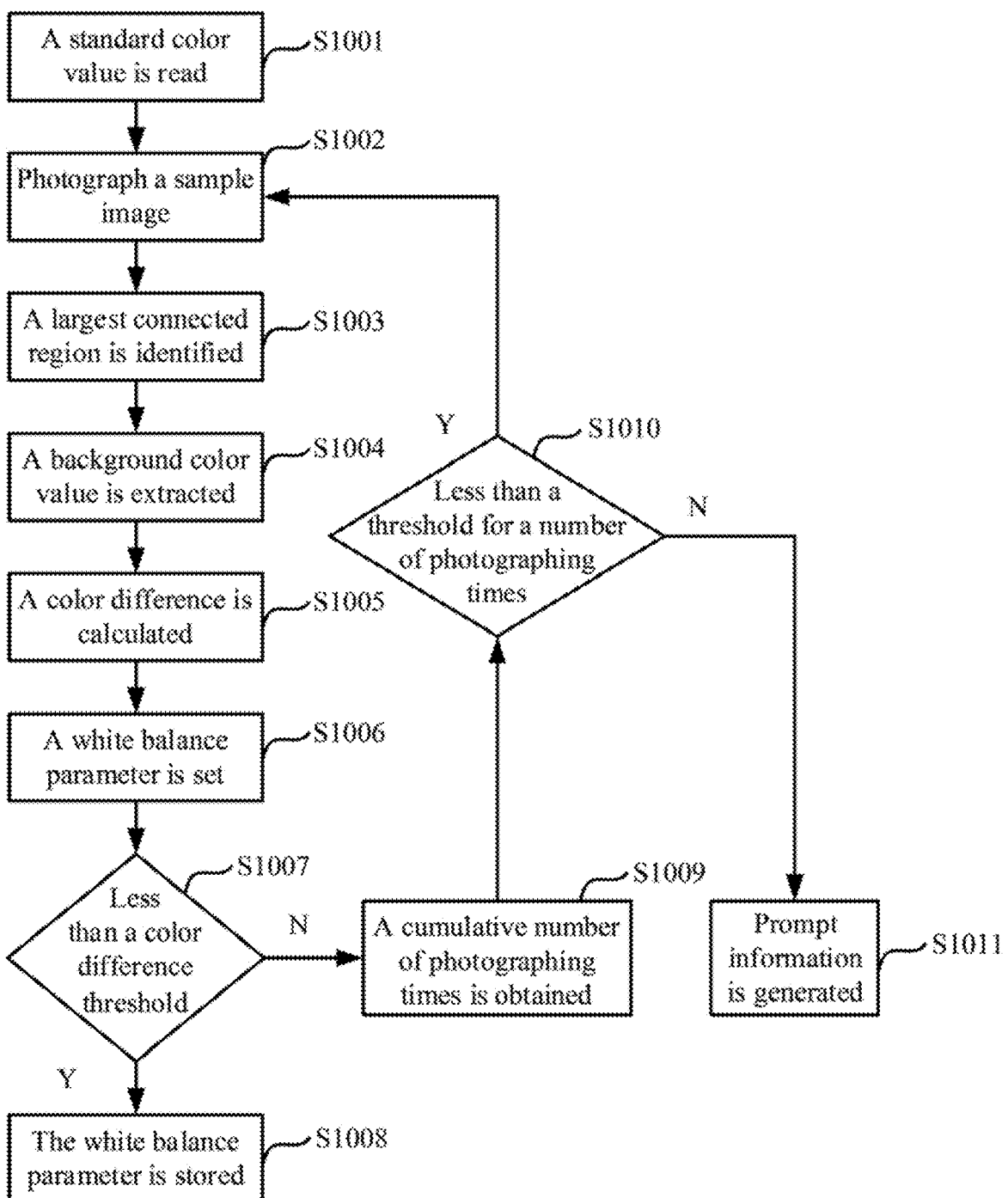
FIG. 10 is a schematic flowchart of a resampling process according to embodiments of the present disclosure.

Correspondingly, after the projection apparatus projects the correction image, the at least one processor 23 can obtain a cumulative number of photographing times of the correc-tion image by the camera 21 and obtain a preset threshold for a number of photographing times, and compare the cumu-lative number of photographing times with the preset thresh-old for the number of photographing times to determine whether to perform resampling according to a comparison result. As shown in FIG. 10, following steps are included.

S1001: A standard color value of a correction image is read.

S1002: A camera is controlled to photograph a sample image.

S1003: A largest connected region of the sample image is identified.

S1004: A background color value of the sample image is extracted.

S1005: A color difference is calculated according to the standard color value and the background color value.

S1006: A white balance parameter is set according to the color difference.

S1007: Whether the color difference is less than a color difference threshold is determined. S1008 is performed when the color difference is less than the color differ-ence threshold, and S1009 is performed when the color difference is greater than or equal to the color difference threshold.

S1008: The white balance parameter is stored.

S1009: A cumulative number of photographing times is obtained.

S1010: Whether the number of photographing times is less than a threshold for a number of photographing times. S1002 is performed when the number of photo-graphing times is less than the threshold for the number of photographing times. S1011 is performed when the number of photographing times is greater than or equal to the threshold for the number of photographing times.

S1011: Prompt information is generated.

When the cumulative number of photographing times is greater than or equal to the preset threshold for the number of photographing times, it indicates that the current image quality adjustment process has reached the maximum num-ber of times of automatic adjustment, and it is possible that the color distortion can still affect the user's viewing expe-rience after many times of image quality adjustment, in this case, the user can be prompted to perform manual adjust-ment, that is, prompt information is generated and the light emitting component 21 is controlled to project the prompt information onto the projection surface. The prompt infor-mation is used for prompting the user that the current image quality adjustment fails.

When the cumulative number of photographing times is less than the preset threshold for the number of photograph-ing times, it indicates that the current image quality adjust-ment process does not reach the maximum number of times of automatic adjustment, in this case, the camera 22 can be controlled to perform photographing again on the correction image to obtain a resample image. Therefore, a background color value in the resample image is extracted, and a difference between the standard color value and the back-ground color value is calculated. That is, the determination and the image quality adjustment are performed again.

The specific image quality adjustment method can be the same as the method for image quality adjustment provided in the above embodiments. That is, for a resample image, a background color value of the resample image can be compared with the standard color value to determine miti-gation of the color distortion defect. When the color differ-ence between the background color value of the resample image and the standard color value is less than or equal to the color difference threshold, it indicates that the image quality adjustment is effective, the light emitting component 21 can be controlled to maintain the adjusted white balance parameter for projection. When the color difference between the background color value of the resample image and the standard color value is larger than the color difference threshold, the image quality is adjusted again. That is, a color difference gain parameter of the background color value of the resample image relative to the standard color value is calculated, and an image quality curve of the projection content is adjusted according to the color difference gain parameter.

It should be noted that due to the influence of factors such as illumination conditions and photographing parameters of the camera 22, there may also be a difference between the sample image photographed by the camera 22 and the real projection effect. In order to reduce the influence of the photographing process, in some embodiments, multiple times of image quality adjustment can also be achieved through multiple times of photographing sample images, to adjust the projection image to a relatively optimal state. Base on this, in the above embodiments, resampling of the correct image and comparison between the background color value in the resample image and the standard color value is not only the test of the image quality adjustment result, but also the color in the finally presented projection image can be closer to the standard color through multiple times of resampling.

That is, in some embodiments, after calculating the color difference between the background color value in the resample image and the standard color value, by comparing the color difference with the color difference threshold, when the color difference is less than or equal to the color difference threshold, resampling can be performed again, and the image quality is adjusted for multiple times by means of resampling. After each calculation of the difference between the background color value in the resample image and the standard color value, the color difference threshold for comparison can be set to a different value.

For example, during the first resampling, the first color difference threshold can be set relatively large, while during the second resampling, the second color difference threshold can be set to be smaller than first color difference threshold. When the difference between the background color value in the image obtained by the second resampling and the standard color value is smaller than or equal to the second color difference, it is determined that the chromatic aberration distortion of the current projection image is smaller, resampling is stopped, and the light emitting component is controlled to project according to a currently determined white balance parameter. When the difference between the background color value in the image obtained by the second resampling and the standard color value is greater than the second color difference, and the third resampling is performed, so that that background color value is gradually close to the standard color value by gradually reducing the color difference threshold for multiple times.

In some embodiments, a fixed number of resampling times can also be set, for example, the number of resampling times is set to 4. In combination with the first sampling, the camera 22 performs a total of five times of image photographing in one image quality adjustment process. After a fixed number of resampling times is set, the projection apparatus can finally determine the white balance parameter conforming to the current scenario through five times of color comparison. Obviously, after five times of color comparison and white balance parameter adjustment, when the color difference in any adjustment process is still not less than the color difference threshold, the light emitting component 21 is controlled to project prompt information to prompt the user of the result of the image quality adjustment.

In the above embodiments, since the color distortion is compensated by adjusting the image quality curve of the image mode, compensation parameters are consistent for a particular background color or color difference. Therefore, the background color (or color difference) can be stored in association with the compensation parameter, so that the compensation parameter can be determined directly according to the background color (or the color difference) in the subsequent image quality adjustment process. Therefore, repetitive determination is not needed, and data processing amount is reduced.

That is, in some embodiments, the projection apparatus further includes a memory, and the memory is configured to store a white balance parameter. For example, a data comparison table can be preset in the memory of the projection apparatus. The data comparison table stores the background color, the standard color, the color difference and the white balance parameter. The background color, the standard color, the color difference, and the white balance parameter are associated with each other. That is, the white balance parameter corresponding to the standard color can be determined through the background color or the color difference for the projection apparatus to adjust the image quality curve subsequently. Accordingly, the at least one processor is further configured to: based on that the difference between the background color value in the resample image and the standard color value is less than or equal to the preset color difference threshold, obtain the white balance parameter for the current image mode. When it is determined that the color difference between the color of the projection image adjusted and the standard color is small by resampling the image, and the user's viewing experience cannot be affected greatly, it can be determined that the image quality adjustment process is effective. Therefore, the white balance parameter corresponding to the current image mode can be obtained. Then the association relationship between the background color value (or color difference) of the sample image and the white balance parameter for the current image mode can be set, and the white balance parameter can be stored according to the set association relationship.

Figure 11:
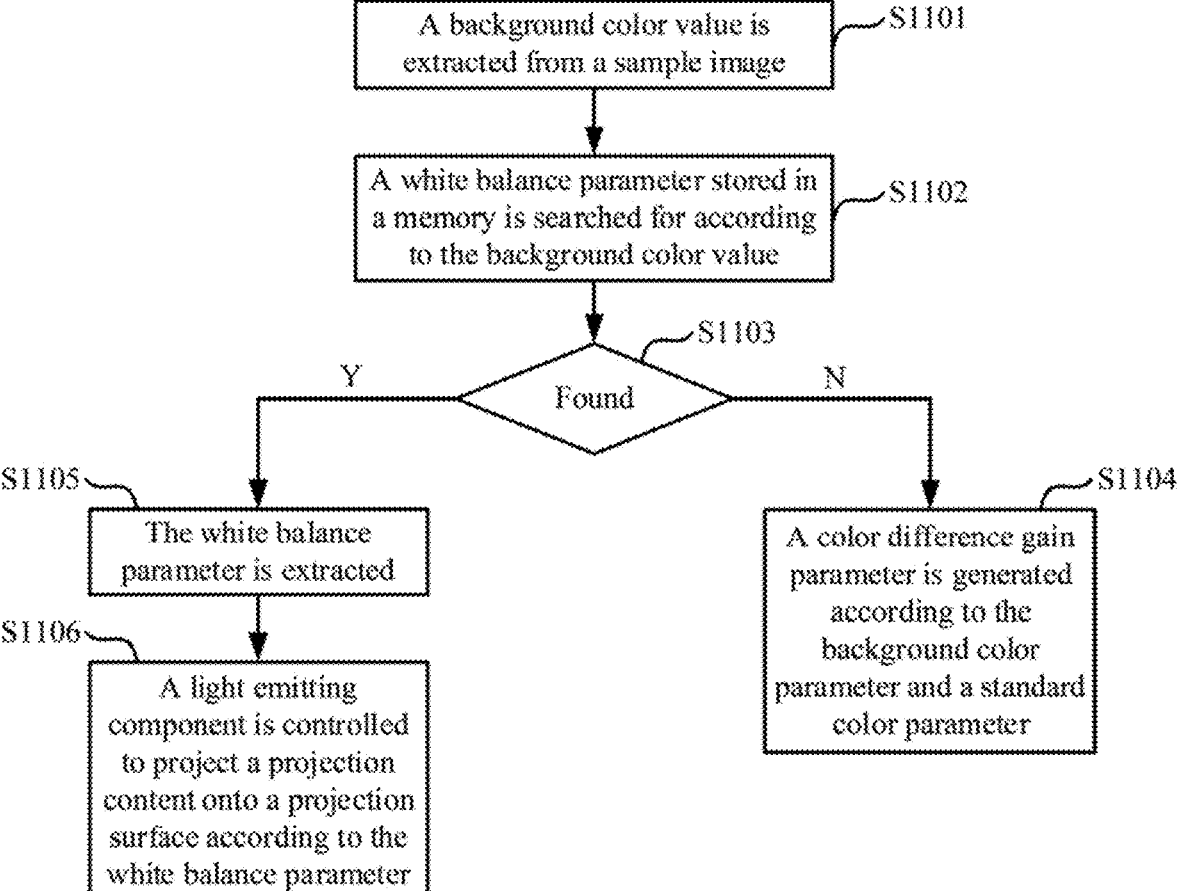
FIG. 11 is a schematic flowchart of extracting a stored white balance parameter according to embodiments of the present disclosure.

It can be seen that in the above embodiments, after the image quality adjustment result of the resample image is verified, when the adjusted image quality can alleviate the problem of color distortion, the corresponding white balance parameter is stored to be directly called in the subsequent image quality adjustment process. As shown in FIG. 11, following steps are included.

S1101: A background color value is extracted from a sample image.

S1102: A white balance parameter stored in a memory is searched for according to the background color value.

S1103: Whether a white balance parameter is found is determined. When no white balance parameter is found, S1104 is performed. When the white balance parameter is found, S1105 is performed.

S1104: A color difference gain parameter is generated according to the background color parameter and a standard color parameter.

S1105: The white balance parameter is extracted.

S1106: A light emitting component is controlled to project a projection content onto a projection surface according to the white balance parameter.

In some embodiments, after performing extracting the background color value from the sample image, the at least one processor 23 can search for the white balance parameter stored in the memory according to the background color value. When the white balance parameter associated with the background color value is found, the white balance parameter is directly extracted, and the light emitting component is controlled to directly project the projection content onto the projection surface according to the extracted white balance parameter. When no white balance parameter associated with the background color value is found, a color difference gain parameter of the background color value relative to the standard color value is calculated, so that the image quality is adjusted in the method provided in the above embodiments.

Figure 12:
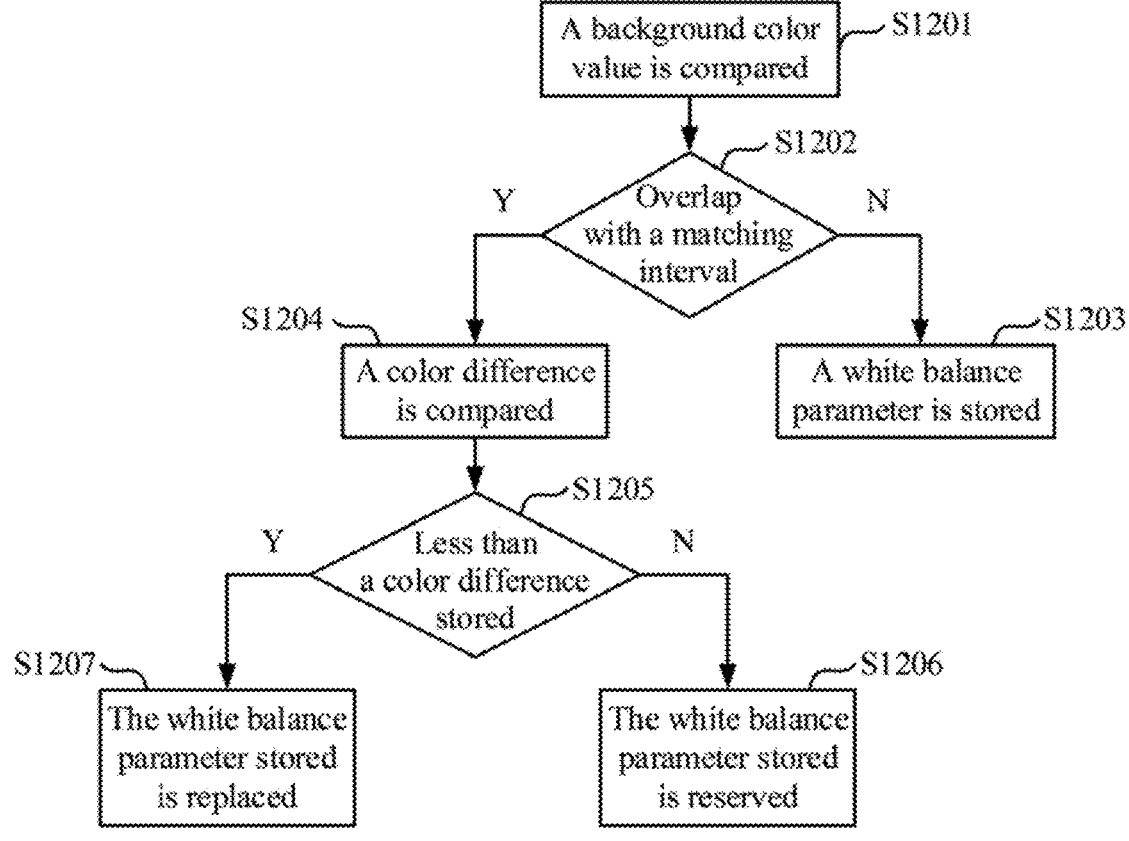
FIG. 12 is a schematic flowchart of storing a white balance parameter according to embodiments of the present disclosure.

It should be noted that when the background color value and the white balance parameter are stored in the memory, it is also possible to set a specific matching interval according to the background color value. For example, for the background color value B1, a deviation value of "+10" can be preset, that is, the matching interval of the background color value B1 is set as (B1−10, B1+10). After the matching interval is set, when the subsequently extracted background color value is within the matching interval, the light emitting component can be directly controlled to project according to the white balance parameter corresponding to the interval, so that the number of times of repetitive determination is reduced, and image quality adjustment efficiency is improved. As shown in FIG. 12, following steps are included.

S1201: A background color value is compared.

S1202: Whether the background color value overlaps with a matching interval.

S1203 is performed when the background color value does not overlap with the matching interval. S1204 is performed when the background color value overlaps with the matching interval.

S1203: A white balance parameter is stored.

S1204: A color difference is compared.

S1205: Whether the color difference is less than a color difference stored is determined. S1206 is performed when the color difference is greater than or equal to the color difference stored. S1207 is performed when the color difference is less than the color difference stored.

S1206: The white balance parameter stored is reserved.

S1207: The white balance parameter stored is replaced.

In some embodiments, as shown in FIG. 12, after a new white balance parameter is obtained for each image quality adjustment, the projection apparatus can also compare the current background color value with the stored background color value before storing. When the current background color value and the stored background color value are equal or the current background color value overlaps with a corresponding matching interval, a color difference corresponding to a resample image in the adjusting process can be compared, to store the background color value with the smaller color difference and the corresponding color difference and white balance parameter.

For example, after the image quality adjustment, it is determined that a current background color value is B1 and a corresponding white balance parameter is WB1, and a color difference determined in a corresponding resampling process is ΔB1. When storing the current background color value B1 and the corresponding white balance parameter WB1, when a stored background color value B2 similar to the current background color value B1, a corresponding white balance parameter WB2 and a color difference ΔB2 in a resampling process are obtained through traversal, the color difference ΔB1 determined in the current resampling process can be compared with the stored color difference ΔB2 in the resampling process, to store a background color value and a white balance parameter in a set with a smaller color difference according to a comparison result. That is, when ΔB1>ΔB2, the current background color value B1 and the corresponding white balance parameter WB1 are discarded, the background color value B2 and the corresponding white balance parameter WB2 are still stored. When ΔB1<ΔB2, the stored background color value B2 and the corresponding white balance parameter WB2 are replaced with the current background color value B1 and the corresponding white balance parameter WB1, as the white balance parameter that can be called directly in the subsequent image quality adjustment process.

Based on the above method for projection image quality adjustment, some embodiments of the present disclosure further provide a projection apparatus. The projection apparatus includes a light emitting component 21, a camera 22, and at least one processor 23. The light emitting component 21 is configured to project a projection content onto a projection surface, the camera 22 is configured to photograph a sample image, and the at least one processor 23 is configured to perform the method for projection image quality adjustment provided in the above embodiments. The method includes followings steps.

Step S100: A control command for image quality adjustment is obtained.

Step S200: In response to the control command, a light emitting component is controlled to project a correction image onto a projection surface, and the correction image includes a graphic card based on a standard color parameter.

S300: A sample image photographed by a camera for the correction image on the projection surface is obtained, and a background color parameter is extracted from the sample image.

S400: A color difference gain parameter is generated according to the background color parameter and the standard color parameter.

S500: An image quality curve of a projection content is adjusted according to the color difference gain parameter, and the light emitting component is controlled to project the projection content onto the projection surface according to the image quality curve adjusted.

In order to implement the method for image quality adjustment, in the at least one processor or the operating system of the projection apparatus, a plurality of function levels and modules can be pre-configured according to functions. For example, the at least one processor of the projection apparatus can be configured with four functional layers including an application layer, a framework layer, a middleware and a drive layer, and three main functional modules including a setting module, a background color identification module and an image quality processing module. The application layer is mainly used for completing triggering of background identification. That is, user active triggering and conditional automatic triggering can be adopted, so that when the user watches normally, the normal viewing effect of the user is not affected. The framework layer is used for providing path support and transferring the user's trigger action to the middleware. The middleware is used for reading original data, image acquisition, color recognition, and data processing. The drive layer is used for sending the white balance parameter calculated by the middleware to the image quality processing module.

It can be seen from the above embodiments that, after obtaining the control command for image quality adjustment, the projection apparatus provided in the above embodiments can control the light emitting component to project a correction image including a graphic card based on a standard color parameter onto a projection surface, photograph the correction image through a camera to obtain a sample image, and extract a background color parameter from the sample image; then calculate a color difference gain parameter of the background color parameter relative to the standard color parameter; finally, adjust an image quality curve of the projection content according to the color difference gain parameter, and control the optical machine to project the projection content onto the projection surface according to the image quality curve adjusted. The projection apparatus can detect the image effect projected by the light emitting component in real time through the camera, and adjust the image quality curve of the projection content according to the color difference gain parameter, to alleviate the influence of the color of the projection surface on the color of the projection content, improve the quality of the projection image, so that the projection apparatus can adapt to background walls of different colors, and the user's experience is improved.

Similar parts between embodiments provided in the present disclosure can be referred to each other, embodiments provided above are only a few examples under the general concept of the present disclosure, and do not constitute the limitation of the protection scope of the present disclosure. For those skilled in the art, other embodiments extended according to the scheme of the present disclosure without creative work belong to the protection scope of the present disclosure.

What is claimed is:

1. A projection apparatus, comprising:
a light emitting component, configured to project a projection content onto a projection surface;
a camera, configured to photograph a sample image;
at least one processor, in connection with the light emitting component and the camera, and configured to execute instructions to cause the projection apparatus to:
obtain a control command for image quality adjustment;
in response to the control command, control the light emitting component to project a correction image onto the projection surface; wherein the correction image comprises a graphic card based on a standard color parameter;
obtain a sample image photographed by the camera for the correction image on the projection surface, and extract a background color parameter from the sample image;
generate a color difference gain parameter according to the background color parameter and the standard color parameter; and
adjust an image quality curve of the projection content according to the color difference gain parameter, and control the light emitting component to project the projection content onto the projection surface according to the image quality curve adjusted.

2. The projection apparatus according to claim 1, wherein the at least one processor is further configured to execute instructions to cause the projection apparatus to:
obtain a plurality of correction images, wherein the plurality of correction images are respectively based on different standard color parameters;
control the light emitting component to sequentially project the plurality of correction images onto the projection surface.

3. The projection apparatus according to claim 2, wherein the at least one processor is further configured to execute instructions to cause the projection apparatus to:
obtain a projection content switching signal from the light emitting component; wherein the projection content switching signal is generated when the light emitting component projects different correction images;
in response to the projection content switching signal, send a photographing instruction to the camera, for the camera to photograph a plurality of sample images for the plurality of correction images.

4. The projection apparatus according to claim 1, wherein the at least one processor is further configured to execute instructions to cause the projection apparatus to:
identify a largest connected region from the sample image; wherein the largest connected region is a region in which color differences of pixels in the sample image are less than a color difference threshold and an area occupied by the pixels is the largest;
extract color values of a plurality of position points in the largest connected region;
calculate a background color value according to the color values of the plurality of position points; wherein the background color value is an average value of the color values of the plurality of position points.

5. The projection apparatus according to claim 1, wherein the at least one processor is further configured to execute instructions to cause the projection apparatus to:
obtain a standard color value corresponding to the correction image and a background color value corresponding to the sample image;
calculate a difference between the standard color value and the background color value;
based on that the difference is greater than a preset color difference threshold, generate the color difference gain parameter according to the difference, and set the color difference gain parameter to a white balance parameter for a current image mode.

6. The projection apparatus according to claim 5, wherein the at least one processor is further configured to execute instructions to cause the projection apparatus to:
based on that the difference is less than or equal to the preset color difference threshold, control the light emitting component to project the projection content onto the projection surface according to an original image quality.

7. The projection apparatus according to claim 5, wherein the at least one processor is further configured to execute instructions to cause the projection apparatus to:
control the light emitting component to project the correction image according to an image mode in which the white balance parameter is set;
obtain a cumulative number of photographing times of the correction image by the camera;
based on that the cumulative number of photographing times is less than a preset threshold for a number of photographing times, control the camera to photograph the correction image again to obtain a resample image;
extract a background color value in the resample image, and calculate a difference between the standard color value and the background color value in the resample image.

8. The projection apparatus according to claim 7, wherein the at least one processor is further configured to execute instructions to cause the projection apparatus to:
based on that the cumulative number of photographing times is greater than or equal to the preset threshold for the number of photographing times, generate prompt information; wherein the prompt information is used for prompting a user that current image quality adjustment fails;

control the light emitting component to project the prompt information onto the projection surface.

9. The projection apparatus according to claim 7, further comprising a memory configured to store the white balance parameter; wherein the at least one processor is further configured to execute instructions to cause the projection apparatus to:

based on that the difference between the background color value in the resample image and the standard color value is less than or equal to the preset color difference threshold, obtain the white balance parameter for the current image mode;

set an association relationship between the background color parameter of the sample image and the white balance parameter for the current image mode;

store the white balance parameter according to the association relationship.

10. The projection apparatus according to claim 9, wherein the at least one processor is further configured to execute instructions to cause the projection apparatus to:

search for the white balance parameter stored in the memory according to the background color parameter;

based on that the white balance parameter associated with the background color parameter is found, extract the white balance parameter, and control the light emitting component to project the projection content onto the projection surface according to the white balance parameter;

based on that no white balance parameter associated with the background color parameter is found, generate the color difference gain parameter according to the background color parameter and the standard color parameter.

11. A method for a projection apparatus, wherein the projection apparatus comprises a light emitting component, a camera and at least one processor, and the method comprises:

obtaining a control command for image quality adjustment;

in response to the control command, controlling the light emitting component to project a correction image onto a projection surface; wherein the correction image comprises a graphic card based on a standard color parameter;

obtaining a sample image photographed by the camera for the correction image, and extracting a background color parameter from the sample image;

generating a color difference gain parameter according to the background color parameter and the standard color parameter; and adjusting an image quality curve of a projection content according to the color difference gain parameter, and controlling the light emitting component to project the projection content onto the projection surface according to the image quality curve adjusted.

12. The method according to claim 11, wherein the controlling the light emitting component to project the correction image onto the projection surface comprises:

obtaining a plurality of correction images, wherein the plurality of correction images are respectively based on different standard color parameters;

controlling the light emitting component to sequentially project the plurality of correction images onto the projection surface.

13. The method according to claim 12, wherein the obtaining the sample image photographed by the camera for the correction image comprises:

obtaining a projection content switching signal from the light emitting component;

wherein the projection content switching signal is generated when the light emitting component projects different correction images;

in response to the projection content switching signal, sending a photographing instruction to the camera, for the camera to photograph a plurality of sample images for the plurality of correction images.

14. The method according to claim 11, wherein the extracting the background color parameter from the sample image comprises:

identifying a largest connected region from the sample image; wherein the largest connected region is a region in which color differences of pixels in the sample image are less than a color difference threshold and an area occupied by the pixels is the largest;

extracting color values of a plurality of position points in the largest connected region;

calculating a background color value according to the color values of the plurality of position points; wherein the background color value is an average value of the color values of the plurality of position points.

15. The method according to claim 11, wherein the generating the color difference gain parameter according to the background color parameter and the standard color parameter comprises:

obtaining a standard color value corresponding to the correction image and a background color value corresponding to the sample image;

calculating a difference between the standard color value and the background color value;

based on that the difference is greater than a preset color difference threshold, generating the color difference gain parameter according to the difference, and setting the color difference gain parameter to a white balance parameter for a current image mode.

16. The method according to claim 15, wherein after calculating the difference between the standard color value and the background color value, the method further comprises:

based on that the difference is less than or equal to the preset color difference threshold, controlling the light emitting component to project the projection content onto the projection surface according to an original image quality.

17. The method according to claim 15, wherein after setting the color difference gain parameter to the white balance parameter for the current image mode, the method further comprises:

controlling the light emitting component to project the correction image according to an image mode in which the white balance parameter is set;

obtaining a cumulative number of photographing times of the correction image by the camera;

based on that the cumulative number of photographing times is less than a preset threshold for a number of photographing times, controlling the camera to photograph the correction image again to obtain a resample image;

extracting a background color value in the resample image, and calculating a difference between the standard color value and the background color value in the resample image.

18. The method according to claim 17, wherein after obtaining the cumulative number of photographing times of the correction image by the camera, the method further comprises:

based on that the cumulative number of photographing times is greater than or equal to the preset threshold for the number of photographing times, generating prompt information;

wherein the prompt information is used for prompting a user that current image quality adjustment fails;

controlling the light emitting component to project the prompt information onto the projection surface.

19. The method according to claim 17, wherein the projection apparatus further comprises a memory configured to store the white balance parameter; the method further comprises:

based on that the difference between the background color value in the resample image and the standard color value is less than or equal to the preset color difference threshold, obtaining the white balance parameter for the current image mode;

setting an association relationship between the background color parameter of the sample image and the white balance parameter for the current image mode;

storing the white balance parameter according to the association relationship.

20. The method according to claim 19, wherein after extracting the background color parameter from the sample image, the method further comprises:

searching for the white balance parameter stored in the memory according to the background color parameter;

based on that the white balance parameter associated with the background color parameter is found, extracting the white balance parameter, and controlling the light emitting component to project the projection content onto the projection surface according to the white balance parameter;

based on that no white balance parameter associated with the background color parameter is found, generating the color difference gain parameter according to the background color parameter and the standard color parameter.

* * * * *